United States Patent
Matsushita

(10) Patent No.: US 9,958,989 B2
(45) Date of Patent: May 1, 2018

(54) COORDINATE INPUT APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Akihiro Matsushita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 123 days.

(21) Appl. No.: 15/012,952

(22) Filed: Feb. 2, 2016

(65) Prior Publication Data
US 2016/0231867 A1    Aug. 11, 2016

(30) Foreign Application Priority Data
Feb. 5, 2015  (JP) ................................. 2015-021490

(51) Int. Cl.
G06F 3/041    (2006.01)
G06F 3/042    (2006.01)

(52) U.S. Cl.
CPC .......... *G06F 3/0428* (2013.01); *G06F 3/0416* (2013.01)

(58) Field of Classification Search
CPC .............................. G06F 3/0421; G06F 3/0428
See application file for complete search history.

(56) References Cited

U.S. PATENT DOCUMENTS

| | | | | |
|---|---|---|---|---|
| 5,304,988 A | * | 4/1994 | Seto ........................ | G06K 15/02 345/443 |
| 2004/0021645 A1 | * | 2/2004 | Kobayashi ............ | G06F 3/0433 345/173 |
| 2008/0284987 A1 | * | 11/2008 | Yonezawa ............ | H04N 9/3185 353/70 |
| 2011/0210979 A1 | * | 9/2011 | Furui .................... | H04N 9/3147 345/619 |
| 2013/0234955 A1 | * | 9/2013 | Takano ................. | G06F 3/0421 345/173 |
| 2013/0257814 A1 | * | 10/2013 | Kobayashi ............ | G06F 3/0421 345/175 |
| 2014/0062963 A1 | | 3/2014 | Matsushita et al. | |
| 2015/0205437 A1 | * | 7/2015 | Takahashi ............. | G06F 3/0418 345/178 |

FOREIGN PATENT DOCUMENTS

JP    2004272353 A    9/2004
JP    2014048960 A    3/2014

* cited by examiner

*Primary Examiner* — Lin Li
(74) *Attorney, Agent, or Firm* — Rossi, Kimms & McDowell LLP

(57) ABSTRACT

A coordinate input apparatus detects a specified position in a coordinate-input effective area using a light projector that projects light onto a coordinate input surface and a plurality of light receptors that receive the light projected by the light projector. The coordinate input apparatus sets a first coordinate system based on a positional relationship between two light receptors constituting a first combination of the plurality of light receptors and a second coordinate system based on a positional relationship between two light receptors constituting a second combination that is different from the first combination, and converts a coordinate value of the specified position detected using the second coordinate system into a coordinate value in the first coordinate system.

12 Claims, 9 Drawing Sheets

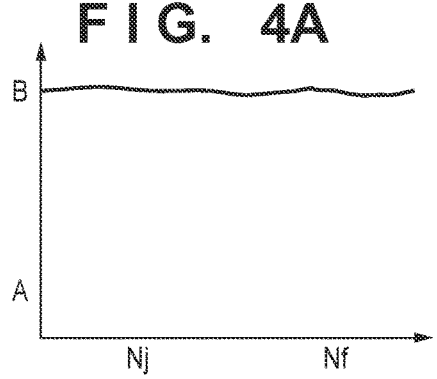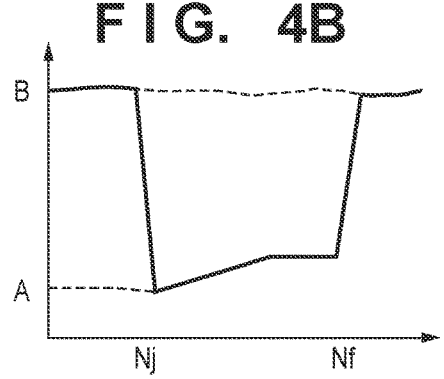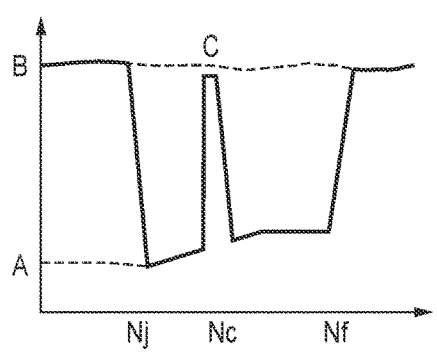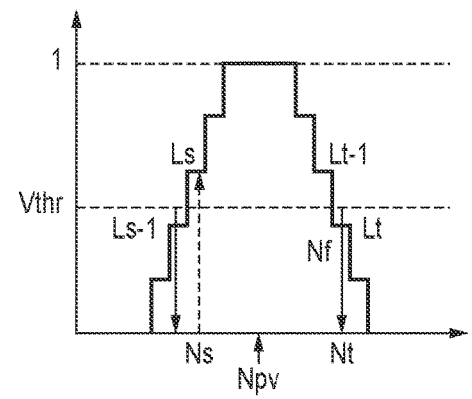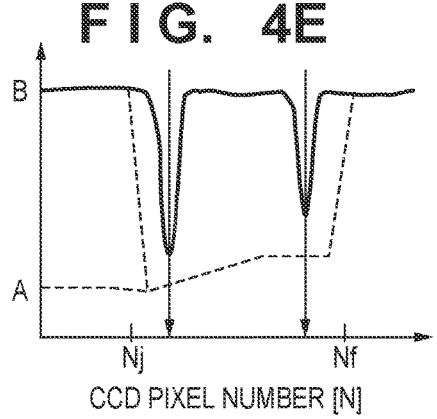

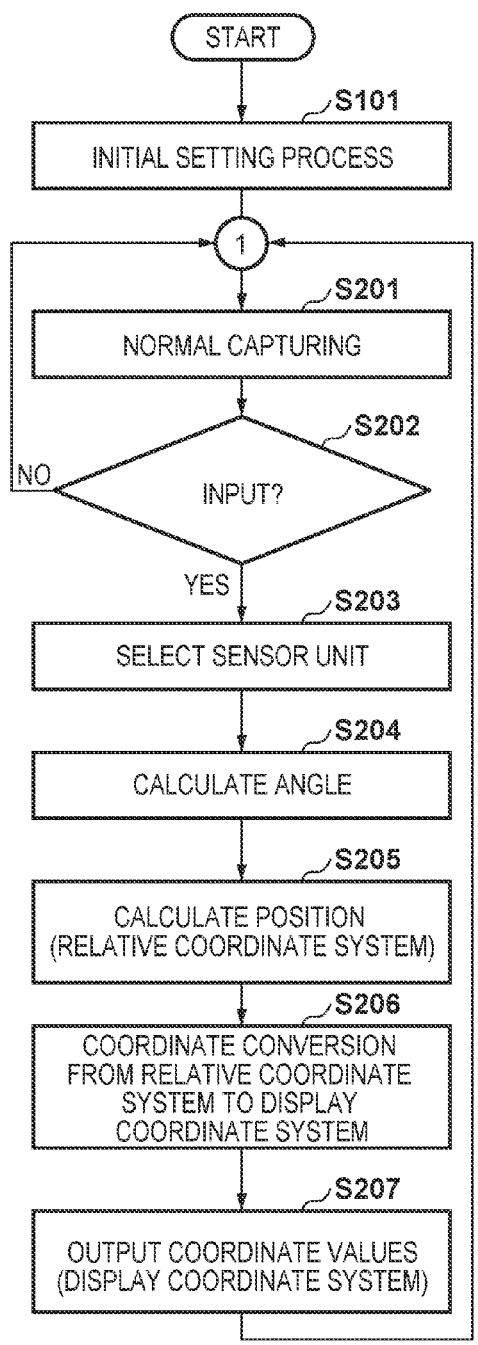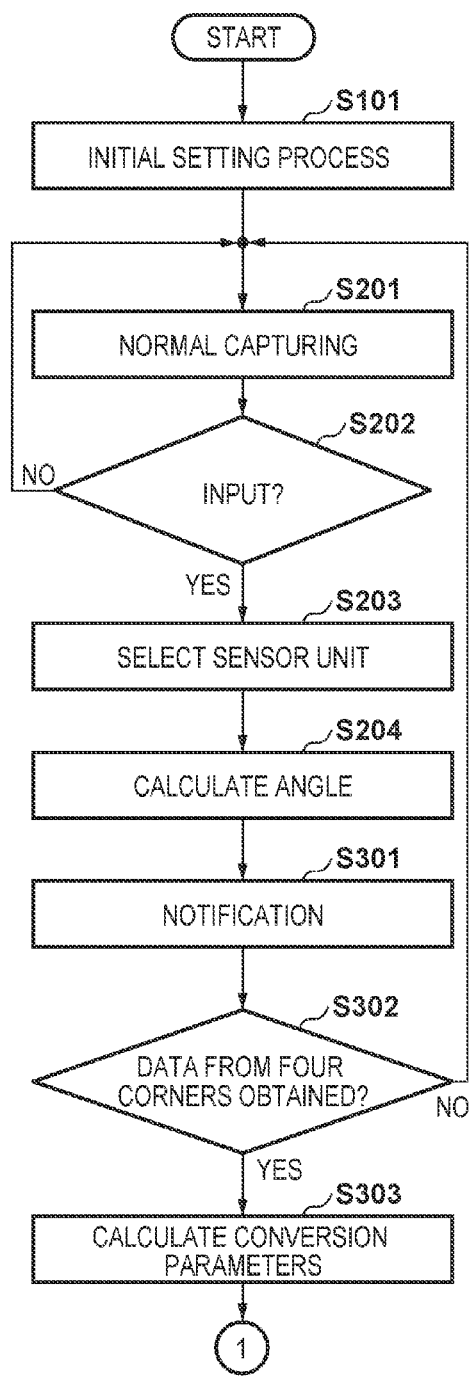

COORDINATE INPUT APPARATUS, CONTROL METHOD THEREOF, AND NON-TRANSITORY COMPUTER-READABLE STORAGE MEDIUM

BACKGROUND OF THE INVENTION

Field of the Invention

The present invention relates to coordinate input apparatuses that optically detect a coordinate location input on a coordinate input surface using a pointing device, such as a finger, for inputting and selecting information. The present invention particularly relates to removable and portable coordinate input apparatuses.

Description of the Related Art

Thus far, various types of coordinate input apparatuses (such as touch panels, digitizers, and so on) have been proposed or commercialized as this type of coordinate input apparatus. For example, touch panels and the like, which allow a terminal such as PC (personal computer) or the like to be operated with ease simply by touching a screen with a finger without using a special tool, have become widespread.

Various coordinate input systems are used in such touch panels, such as panels that employ resistive films, panels that employ ultrasound waves, and so on. A system in which a retroreflective material is provided on an outer side of a coordinate input surface, light from a light projector is reflected by the retroreflective material, and a light amount distribution thereof is detected by a light receptor (an optical shielding system) is known as a system that uses light (see Japanese Patent Laid-Open No. 2004-272353, for example). This method detects a direction of a light-shielded portion (region) shielded from light by a finger or the like within a coordinate input region, and determines the coordinates of a light-shielded position, or in other words, of a coordinate input position. Meanwhile, Japanese Patent Laid-Open No. 2014-48960 discloses a system that improves usability by enabling a coordinate input apparatus to be installed in a desired location.

Integrating this type of coordinate input apparatus with a display device makes it possible to control display states, display trajectories of specified positions as handwriting in the same manner as writing on paper with a pencil, and so on, simply by touching the display screen of the display device.

Various types of flat-panel displays, such as liquid crystal display devices, front projectors, and so on are known as display devices. In the case of a flat-panel display, such an operational environment can be realized by overlaying the coordinate input apparatus thereon, with a mobile device such as a smartphone being a typical example thereof. As flat-panel displays increase in size, such displays are being combined with large-format touch panels, which are now being introduced in fields such as digital signage, for example.

Several types of errors caused by the configuration can arise in such devices. To describe several the main causes of such errors, for example, a light-receiving device such as a charge coupled device (CCD) line sensor, a complementary metal oxide semiconductor (CMOS) sensor, or the like is used as a light receptor that detects light. Light is received by the light-receiving device in units of pixels, and thus when the received light is quantized in units of pixels, quantization error will arise. In addition, table lookup or conversion such as polynomial approximation is used as a method for converting pixel numbers of pixels detected by the light-receiving device into angle values, but some error will occur in either of those methods. Furthermore, in the case where the device is anchored to a housing, a process such as recording a reference angle used in coordinate calculation is carried out. For example, this process measures numbers of pixels indicating an angle with the horizontal direction or the like used as a reference when the apparatus is assembled, and records that number in a memory in the apparatus. Measurement error or the like occurs at this time. Furthermore, it is also conceivable that error will occur as placement positions in the apparatus shift due to changes over time. These various causes of error will result in the angles detected by the light-receiving device containing error as well.

If the angles detected by the light-receiving device contain error, a problem will arise in that the coordinates calculated on the screen will not match the touched position. In order to reduce the difference between the two, it is necessary to reduce the error that occurs by increasing the pixel resolution of the light-receiving device, improve the mechanical precision of the apparatus, and so on. In reality, design levels are determined in consideration of, among other things, a balance between costs and functions/performance.

Referring to, for example, FIG. 13B of Japanese Patent Laid-Open No. 2014-48960, if error is present when $\theta 17$ or $\theta 18$ is an acute angle, error in the calculated coordinates takes on a high value, and the position actually input is shifted relative to the touched position as a result. This can result in a drawing position being shifted, a pointer being shifted, or the like, for example, which in turn can make it impossible to carry out desired operations, such as clicking and selecting objects and so on.

SUMMARY OF THE INVENTION

The present invention provides a technique that enables coordinates to be input accurately.

According to one aspect of the present invention, there is provided a coordinate input apparatus that detects a specified position in a coordinate-input effective area using a light projector that projects light onto a coordinate input surface and a plurality of light receptors that receive the light projected by the light projector, the apparatus comprises a setting unit configured to set a first coordinate system based on a positional relationship between two light receptors constituting a first combination of the plurality of light receptors and a second coordinate system based on a positional relationship between two light receptors constituting a second combination that is different from the first combination, and a conversion unit configured to convert a coordinate value of the specified position detected using the second coordinate system into a coordinate value in the first coordinate system.

Further features of the present invention will become apparent from the following description of exemplary embodiments (with reference to the attached drawings).

BRIEF DESCRIPTION OF THE DRAWINGS

FIGS. 4A to 4E are diagrams illustrating detection signal waveforms according to the first embodiment.

FIGS. 8A and 8B are flowcharts illustrating normal operations and a calibration process according to the first embodiment.

DESCRIPTION OF THE EMBODIMENTS

Figure 1:
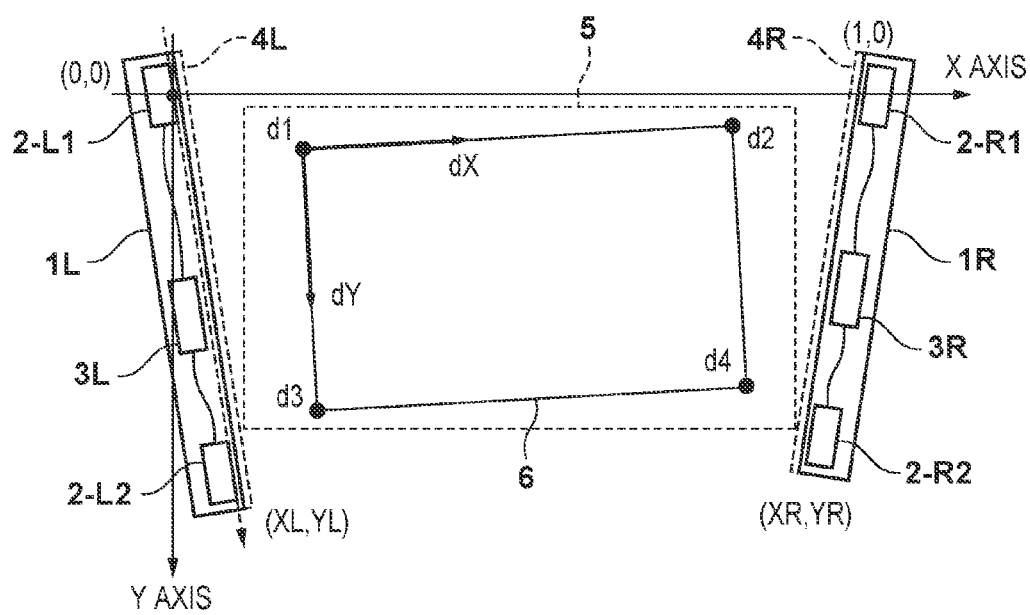
FIG. 1 is an overall schematic diagram illustrating a coordinate input apparatus according to a first embodiment.

Embodiments of the present invention will be described hereinafter in detail with reference to the appended drawings. It should be noted that the configurations described in the following embodiments are merely examples, and that the present invention is not intended to be limited to the configurations described therein and illustrated in the drawings.

First Embodiment

The overall configuration of a coordinate input apparatus according to a first embodiment will be described using FIG. 1.

1L indicates a sensor bar serving as a housing that includes sensor units 2-L1 and 2-L2 (a first sensor unit and a second sensor unit), which serve as at least two angle detection sensor units. 1R, meanwhile, indicates a sensor bar serving as a housing that includes sensor units 2-R1 and 2-R2 (a third sensor unit and a fourth sensor unit).

First, an image is projected and displayed on a display surface such as a planar whiteboard or the like using a display device such as a front projector or the like. A region where the image displayed is indicated as a display area 6, and this is set to be within a range of a coordinate-input effective area 5. Of course, the display surface is not limited to a whiteboard, and may be a wall surface or the like as well.

Next, the sensor bars 1L and 1R (referred to collectively as sensor bars 1) are installed on outer sides of the display area 6 by a user. The sensor bars 1 contain magnets, for example, and can therefore be attached to the whiteboard.

Retroreflective portions 4L and 4R (collectively referred to as retroreflective portions 4) are, as illustrated in FIG. 1, mounted on side surfaces on the sensor bars 1L and 1R, respectively. The configuration is such that the retroreflective portions 4L and 4R are capable of recursively reflecting infrared light projected by the sensor units in the sensor bar 1L or 1R provided on opposing sides, respectively.

The sensor units 2-L1 and 2-L2 are provided in the sensor bar 1L, and the sensor units 2-R1 and 2-R2 are provided in the sensor bar 1R. An operation control circuit 3L provided in the sensor bar 1L controls the sensor units 2-L1 and 2-L2, and along with processing output results thereof, controls an operation control circuit 3R provided in the sensor bar 1R. The operation control circuit 3R of the sensor bar 1R controls the sensor units 2-R1 and 2-R2, processes output results thereof, and sends those results to the operation control circuit 3L of the sensor bar 1L. The operation control circuit 3L of the sensor bar 1L then processes the output results from the four sensor units 2-L1, 2-L2, 2-R1, and 2-R2, calculates a specified position (touch position), and outputs a result thereof to an external device such as a personal computer or the like.

The sensor units 2-L1, 2-L2, 2-R1, and 2-R2 (collectively referred to as sensor units 2) each includes a light projector and a light receptor. Each light projector is constituted of an optical system, including an infrared LED, a light projecting lens, and so on, that projects light toward a coordinate input surface surrounded by the four sensor units. Each light receptor, meanwhile, is constituted of an optical system, including a line CCD, a light receiving lens, and so on, that receives incoming light. Here, the internal structures and so on of the light projectors and the light receptors are described in detail in, for example, Japanese Patent Laid-Open No. 2014-48960, and thus detailed descriptions thereof will not be given here.

Although the operation control circuit 3L of the sensor bar 1L and the operation control circuit 3R of the sensor bar 1R illustrated in FIG. 1 are configured so as to have, for example, functions for communicating wirelessly or the like with each other and use those communication functions to exchange data (a wireless connection), the configuration is not limited thereto. The communication may be carried out using wired communication functions as well.

Figure 2:
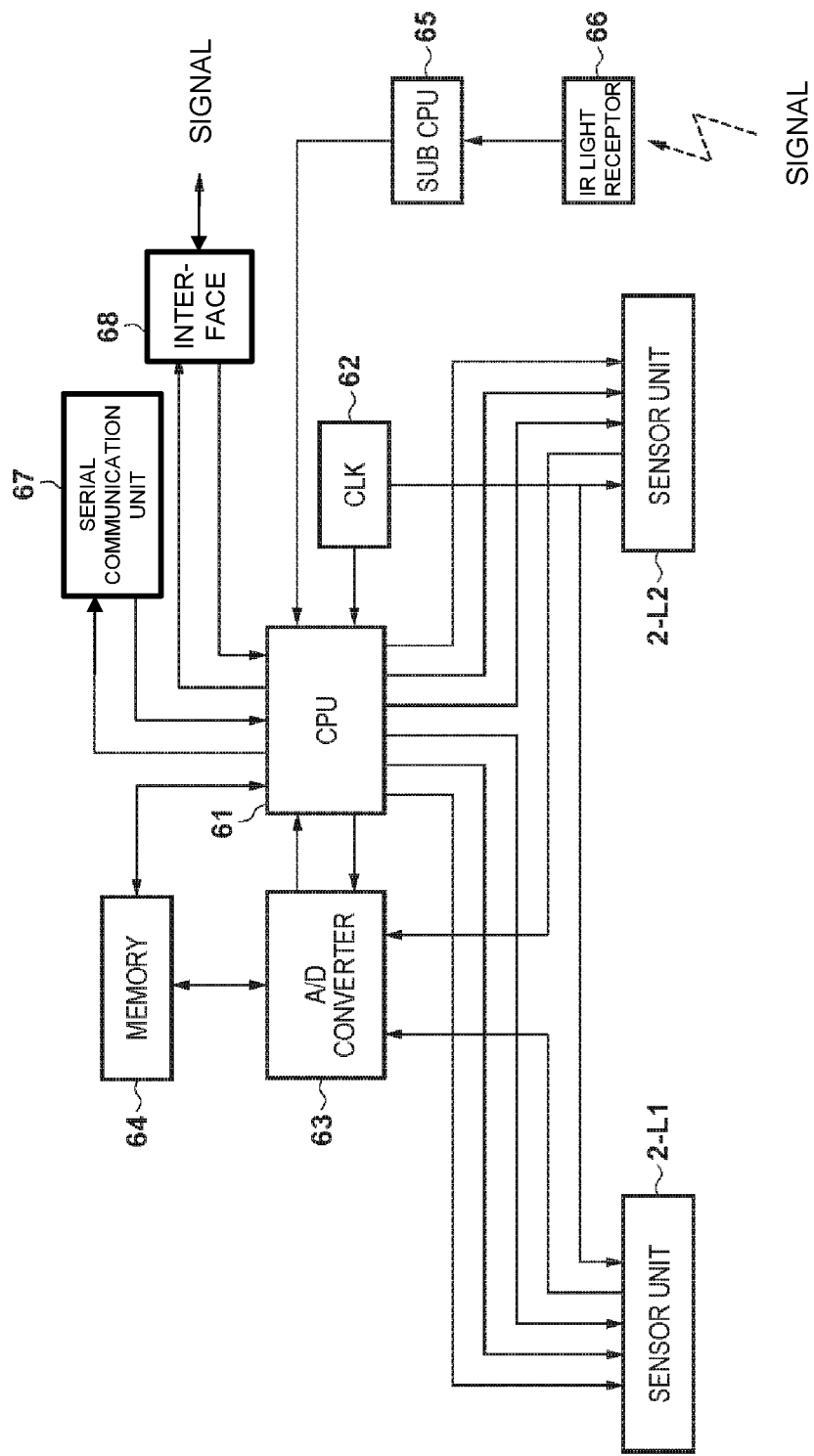
FIG. 2 is a diagram illustrating operations carried out in a first detection mode of an operation control circuit according to the first embodiment.

FIG. 2 is a block diagram illustrating the operation control circuits 3. Aside from the specifications of their interfaces to the exterior, the operation control circuit 3L of the sensor bar 1L and the operation control circuit 3R of the sensor bar 1R according to the first embodiment have the same circuit configurations, and carry out control of and operations for the corresponding sensor units 2 connected thereto. FIG. 2 particularly illustrates the configuration of the operation control circuit 3L of the sensor bar 1L.

CCD control signals for the line CCDs of the sensor units 2-L1 and 2-L2 are outputted from a CPU 61 configured as a single-chip microcomputer or the like, and control the shutter timings, data output, and so on of the line CCDs. A CCD clock is sent to the sensor units 2-L1 and 2-L2 from a clock generating circuit CLK 62, and is also input into the CPU 61 in order to carry out various types of control in synchronization with the line CCDs. Note that LED driving signals for driving infrared LEDs 31 of the sensor units 2-L1 and 2-L2 are supplied from the CPU 61.

Detection signals from the line CCDs of the sensor units 2-L1 and 2-L2, respectively, are input into an A/D converter 63 and converted to digital values under the control of the CPU 61. The digital values obtained from the conversion are stored in a memory 64 and used in angle calculations. A geometric specified position is calculated from the calculated angle information and is output to an information processing apparatus such as an external PC or the like through an interface 68 (a USB interface, for example).

As described earlier, the operation control circuit 3 in each sensor bar 1 controls two sensor units 2. Assuming that the operation control circuit 3L of the sensor bar 1L carries out the main functions, the CPU 61 synchronizes the circuits by sending control signals to the operation control circuit 3R of the sensor bar 1R through a serial communication unit 67. Necessary data is then obtained from the operation control circuit 3R.

Operations between the operation control circuits 3L and 3R are carried out through master/slave control. In the first embodiment, the operation control circuit 3L is the master and the operation control circuit 3R is the slave. Although each operation control circuit can serve as the master or the slave, the master/slave relationship can be switched by inputting a switching signal to a port of the CPU 61 using a switching unit such as a dip switch or the like (not shown).

To obtain data of the sensor units 2-R1 and 2-R2 in the sensor bar 1R provided on the opposing side, the control signal is sent to the operation control circuit 3R of the slave through the serial communication unit 67 from the operation control circuit 3L of the sensor bar 1L serving as the master. The angle information obtained by the sensor units 2-R1 and 2-R2 is calculated and sent to the operation control circuit 3L on the master side through the serial communication unit 67.

In the case of the first embodiment, the interface 68 is provided in the operation control circuit 3L on the master side. 66, meanwhile, indicates an infrared light receptor for when a dedicated stylus (not shown) that emits infrared is used as a pointing device. 65 indicates a sub CPU for decoding signals from the dedicated stylus. The dedicated stylus has a switch that detects when a tip of the stylus has been pressed against an input surface, various switches on a side area of the stylus housing, and so on. Operating states of the dedicated stylus can be detected by sending states of the switches, stylus identification information, and so on using an infrared light emitting unit provided in the dedicated stylus.

Figure 3:
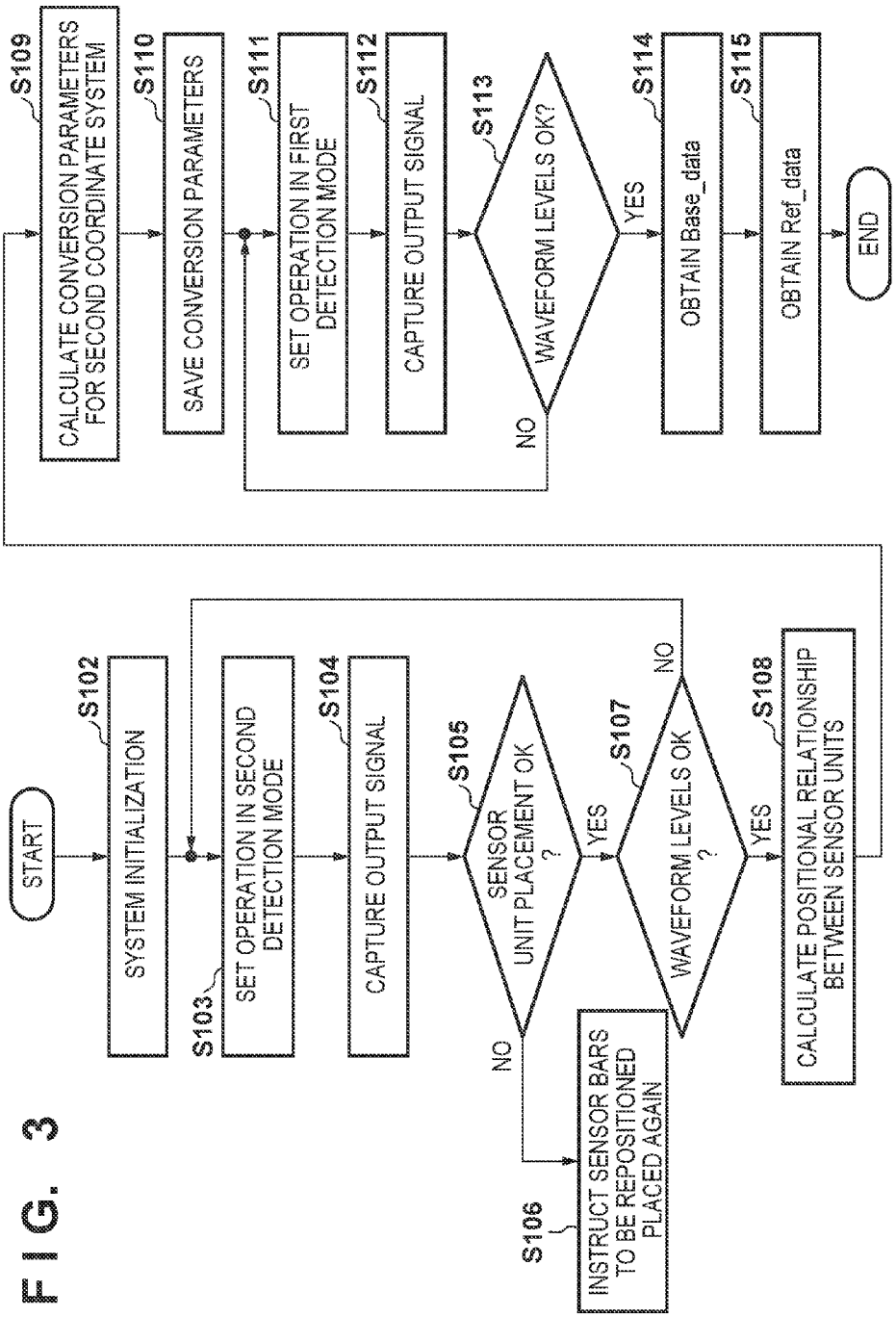
FIG. 3 is a flowchart illustrating an initial setting process according to the first embodiment.

FIG. 3 is a flowchart illustrating an initial setting process from when power is turned on. Note that this initial setting process is realized by the CPU 61 reading out programs stored in the memory 64 and executing those programs upon the user turning the power of the coordinate input apparatus on.

First, the sensor bars 1 are attached to a wall surface by an operator in order to form the rectangular coordinate-input effective area 5 including the entirety of the display area 6, which is a projected image. The sensor bars 1 contain magnets, for example, and can therefore be attached to the wall surface. When the power is turned on, the CPU 61 starts the initial setting process, making various types of initialization operations for the coordinate input apparatus such as setting input and output ports, setting a timer, and so on, and also initializes the line CCD by eliminating excess charges remaining in photoelectric conversion elements (S102).

This coordinate input apparatus has a first coordinate detection mode that detects an instruction (a touch) made by a pointing device such as a finger in the coordinate-input effective area 5, and a second coordinate detection mode for detecting an installation position of the coordinate input apparatus. In the second coordinate detection mode, the sensor units 2-L1 and 2-L2 of the sensor bar 1L directly detect infrared light of the infrared LEDs, emitted from the sensor units 2-R1 and 2-R2 of the opposing sensor bar 1R. Likewise, the sensor units 2-R1 and 2-R2 of the sensor bar 1R directly detect infrared light of the infrared LEDs, emitted from the sensor units 2-L1 and 2-L2 of the opposing sensor bar 1L.

Next, a light amount, which is light reception information detected by the line CCDs, is optimized. White boards, the display area 6, and so on have various sizes depending on the usage environment, and the distance between the sensor bars 1 is set as desired by the user. The intensity of the detected light thus varies depending on the installation state. Accordingly, the CPU 61 carries out operation settings for setting predetermined initial values such as an open shutter time for the line CCDs, a lighting time for the infrared LEDs, and so on, or a driving current of the infrared LEDs or the like (S103). The purpose of the operation settings is to derive relative positional relationship between the four sensor units 2 in a state of operations where light is directly received from the opposing sensor units 2 (the second detection mode).

Next, the CPU 61 captures an output signal from the line CCD (S104). The CPU 61 then determines whether or not light has been successfully detected by checking the positions of the sensor units (S105).

A signal waveform output from the line CCD at this time is illustrated in FIG. 4E. Light emitted from the light projectors of the two sensor units 2 provided on opposing sides, respectively, is received, and thus as illustrated in FIG. 4E, a state in which two peaks are formed can be called a normal state. Here, in the case where light cannot be detected, it is possible that the sensor units 2 in opposing positions are not positioned in a visual field range of the light receptors of the sensor units 2.

Accordingly, in the case where light cannot be detected (NO in S105), the positioning/installation of the sensor bars 1 by the user is in an incorrect state, and a notification to that effect is made, prompting the user to reposition the sensor bars (S106). Once the user has repositioned the sensor bars, the initial setting process is started again.

On the other hand, in the case where light has been successfully detected (YES in S105), the CPU 61 checks a waveform level of the detection signal (S107). In the case where the light of the sensor unit 2 positioned opposite is too intense, such as in the case where at least part of the waveform (waveform level) of the detection signal exceeds a predetermined threshold (NO in S107), the process returns to S103, where settings such as reducing an exposure time are made again. When checked again in S107, it is expected that the detection signal waveform will have a lower optical intensity. Then, in the case where at least part of the detection signal waveform is less than or equal to the predetermined threshold (YES in S107), it is determined that that signal level is appropriate.

The above operations are executed for each sensor unit (four, in the first embodiment), and when all of the signals have been optimized, the CPU 61 executes a positional relationship calculation process that calculates the relative positional relationship between the sensor units 2 (S108).

An example of a method for calculating the position of each sensor unit, carried out in S108, will be described using FIG. 5. First, as described earlier, $\theta1$ to $\theta4$ indicated in FIG. 5 are calculated on the basis of the waveforms of the detection signals obtained by the sensor units. Then, assuming that the waveforms of the detection signals are as indicated in FIG. 4E, pixel numbers corresponding to the two peaks are converted into angle values. Table lookup, a conversion formula, or the like is used to convert from pixel numbers into angle values. A conversion formula can ensure accuracy by using a higher-order polynomial expression, for example, but the order and the like should be determined in light of computational capabilities, accuracy specifications, and so on.

Here, a case where a fifth-order polynomial expression is used will be described as an example. First, a relationship between the pixel numbers and angles of the sensor units is measured when assembling the apparatus or the like. Coefficient data for converting the pixel numbers into angle values using fifth-order polynomial approximation is then calculated from the measurement results. The coefficient data is then stored in the memory 64, which is a non-volatile memory or the like, within the apparatus. Six pieces of coefficient data are necessary in the case where a fifth-order polynomial expression is used, and thus that coefficient data may be stored in the memory 64 when the apparatus is shipped or the like. When the coefficients of the fifth-order polynomial expression are represented by L5, L4, L3, L2, L1, and L0, an angle value θ can be expressed as:

$$\theta = ((((L5*Npr+L4)*Npr+L3)*Npr+L2)*Npr+L1)*Npr+L0 \quad (1)$$

The pixel numbers corresponding to the two respective peaks are converted into angle values through Formula (1). Differences between the two angle values resulting from the conversion are taken as θ1 to θ4, respectively. For example, a difference between the two angle values calculated from the detection waveform of the sensor unit 2-L1 is θ1.

Figure 5:
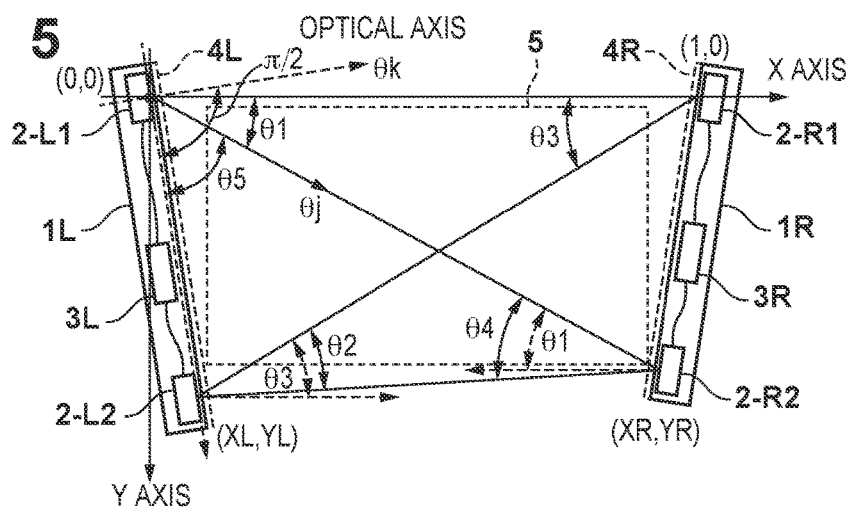
FIG. 5 is a diagram illustrating coordinate calculation carried out by sensor units according to the first embodiment.

Next, as illustrated in FIG. 5, using the sensor unit 2-L1 as an origin, a direction connecting the origin to the sensor unit 2-R1 by a straight line is taken as an X axis, and the direction perpendicular to the X axis is taken as a Y axis. Then, a coordinate value of the sensor unit 2-R1 is set to (1,0), and a coordinate system based on the relative positional relationship between the sensor units is set. The coordinate system based on the combination of the sensor unit 2-R1 and the sensor unit 2-L1 is taken as a first coordinate system (a coordinate system defined by the X axis and the Y axis in FIG. 5).

This coordinate input apparatus is designed so that an angle formed between an optical axis of the sensor unit 2-L1 and a straight line connecting the center of the optical axis of the sensor unit 2-L1 and the center of an optical axis of the sensor unit 2-L2 is a predetermined angle (π/2[rad]), as illustrated in FIG. 5. This value is stored as reference angle information in the memory 64 (a reference angle information storage unit). The reference angle information is stored, for example, through an operation for measuring the reference angle and storing the information in the memory 64, such as when the apparatus is assembled at a factory or the like. Pixel numbers in the optical axis directions of the respective sensor units are measured in advance and stored in the memory 64. When a value obtained by converting a pixel number in the optical axis direction of the sensor unit 2-L1 into an angle value is represented by θk and a value obtained by converting a pixel number corresponding to a peak detected from the sensor unit 2-L1 to the sensor unit 2-R2 into an angle value is represented by θj, θ5 is calculated as follows, using the reference angle information.

$$\theta 5 = \pi/2 - (\theta j - \theta k) \quad (2)$$

Next, the coordinates of the sensor unit 2-L2 and the sensor unit 2-R2 are calculated using θ1 to θ5. Here, when the coordinates of the sensor unit 2-L2 are represented by (XL,YL) and the coordinates of the sensor unit 2-R2 are represented by (XR,YR), the following formulae hold true in the case of FIG. 5.

$$YL = XL*\tan(\theta 1 + \theta 5) \quad (3)$$

$$YL = (1-XL)*\tan\theta 3 \quad (4)$$

$$YR = XR*\tan\theta 1 \quad (5)$$

$$YR - YL = (XR - XL)*\tan(\theta 2 - \theta 3) \quad (6)$$

Based on Formula (3) and Formula (4), $$XL = \tan\theta 3/(\tan(\theta 1 + \theta 5) + \tan\theta 3) \quad (7)$$

Likewise, based on Formula (5) and Formula (6), $$XR = (YL - XL*\tan(\theta 2 - \theta 3))/(\tan\theta 1 - \tan(\theta 2 - \theta 3)) \quad (8)$$

First, XL is calculated using Formula (7). Then, YL is calculated using the calculated XL and Formula (3). Next, XR is calculated using the calculated XL, YL, and Formula (8). Then, YR is calculated using the calculated XR and Formula (5).

The coordinates (XL,YL) of the sensor unit 2-L2 and the coordinates (XR,YR) of the sensor unit 2-R2 are thus calculated through the stated procedure. However, the method of calculating the coordinate values (positions) of the sensor units described here is merely an example, and the calculations may of course be carried out using other formulae, procedures, and so on.

Figure 6:
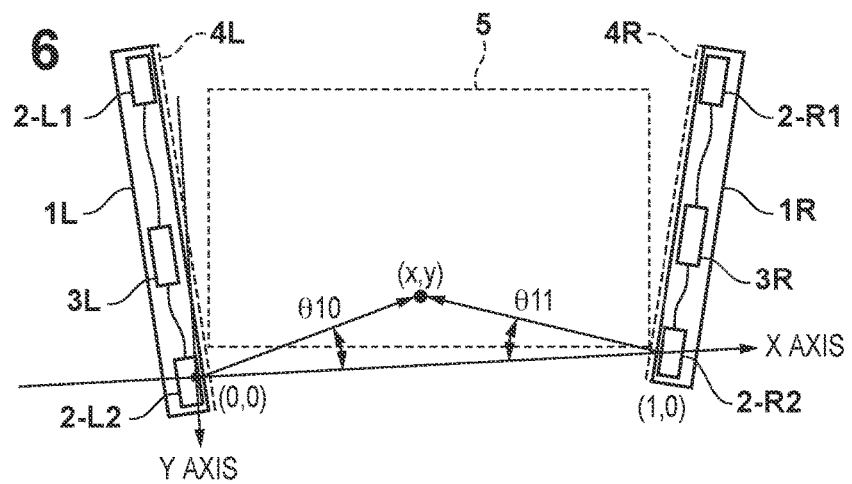
FIG. 6 is a diagram illustrating a second coordinate system according to the first embodiment.

Next, in the coordinate calculation according to the present embodiment, a second coordinate system, different from the XY coordinate system illustrated in FIG. 5, is used in order to improve the accuracy of the calculated coordinates. As illustrated in FIG. 6, the second coordinate system takes the sensor unit 2-L2 as an origin, the coordinate values of the sensor unit 2-R2 as (1,0), and the direction perpendicular to the X axis as the Y axis.

Figure 7:
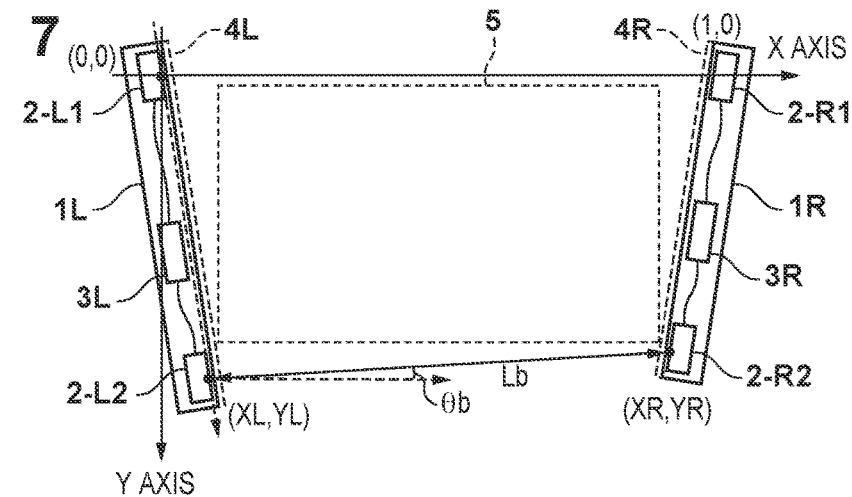
FIG. 7 is a diagram illustrating the calculation of conversion parameters for a coordinate system according to the first embodiment.

In the coordinate calculation described later, coordinate conversion is carried out between the first coordinate system and the second coordinate system. Accordingly, the CPU 61 calculates conversion parameters necessary for the coordinate conversion (S109). Specifically, as illustrated in FIG. 7, a distance Lb between the sensor unit 2-L2 and the sensor unit 2-R2 in the first coordinate system, and an angle θb formed between the X axis direction and a line connecting the sensor unit 2-L2 and the sensor unit 2-R2, are calculated as the conversion parameters.

$$Lb = \text{SQRT}((XR - XL)^2 + (YR - YL)^2) \quad (9)$$

$$\theta b = \text{ARCTAN}((YR - YL)/(XR - XL)) \quad (10)$$

Here, SQRT( ) represents a function for finding a square root, and ARCTAN( ) represents an arc tangent function. The CPU 61 then saves Lb and θb, which are the conversion parameters, in the memory 64 (S110).

From S111 on, the CPU 61 optimizes signal levels obtained when infrared light projected by the sensor units 2 is retroreflected by the retroreflective portions 4 provided on the opposing sensor bars 1 and that light is detected by the sensor bars 1' own light receptors 40. As described above, the positioning of the sensor bars 1 is not absolute, and optimizing the detection levels in accordance with the positioning is carried out in order to obtain stable signals. The items to be set, including the open shutter time of the line CCDs, the lighting time of the infrared LEDs, and so on, or the driving current of the infrared LEDs, are set through the operation settings carried out in the first detection mode (S111). Assuming the operation settings have been set so that the maximum amount of light is obtained for the first time (S111), the CPU 61 captures the output signals from the line CCDs at that time (S112).

The captured output signals correspond to illumination data, and have waveforms such as those indicated in FIG. 4B. Level A indicates that the amount of detected light is at a maximum level, whereas a level B is a level where no light is being detected. If the light is too intense, the light will exceed the dynamic range of the line CCD and the output will saturate, and it will become difficult to calculate the angles accurately. Accordingly, the CPU 61 checks the waveform levels of the detection signals (S113). If it is determined as a result of the check that the waveforms of the detection signal are unsuitable (NO in S113), the process returns to S111, where settings are carried out again so that the waveforms (waveform levels) of the detection signals decrease. Note that here, the retroreflected light is detected, and thus settings are made to significantly increase the amount of light projected as compared to when the light projected by the sensor units 2 is detected directly by the light receptors 40 in the processes of S103 to S107 (in other words, in the second detection mode).

In the case where it is determined that the waveform levels are optimal (YES in S113), the CPU 61 A/D-converts the outputs of the line CCDs using the A/D converter 63 in a state where the light projectors of the sensor units are not emitting light. The CPU 61 then stores those values as Base_Data[N] in the memory 64 (S114). This is data containing variation due to bias in the line CCDs and the like, and is data near the level B indicated in FIG. 4A. Here, [N] indicates the CCD pixel number of the line CCD, and a pixel number corresponding to an active input range is used.

Next, the CPU 61 obtains a light amount distribution in a state where light is projected from the light projectors of the sensor units. This is data indicated by the solid line in FIG. 4B, and the CPU 61 stores this data as Ref_Data[N] in the memory 64 (S115).

Once the data has been obtained in this manner for all of the sensor units, the series of initial setting processing is complete.

Next, the details of processing in normal sampling operations carried out after the initial setting process will be described with reference to the flowchart in FIG. 8A.

The CPU 61 executes the initial setting process illustrated in FIG. 3 (S101). Then, as normal capturing operations (the first detection mode), the CPU 61 detects signals obtained when infrared light projected by the sensor units 2 is retroreflected by the retroreflective portions 4 provided on the opposing sensor bars 1 and that light is detected by the sensor bars 1' own light receptors 40 (S201). The data at that time is Norm_data[N], and assuming that a touch operation is made on the input surface in the coordinate-input effective area 5 and the optical path is blocked, the sensor unit will be unable to detect an optical signal around a pixel number Nc, as indicated in FIG. 4C, for example.

The CPU 61 determines whether or not such a light-shielded portion has been produced by any of the sensor units 2, or in other words, whether or not an input has been made (S202). In the case where it is determined that no input has been made (NO in S202), the process returns to S201, where the sampling is repeated. On the other hand, in the case where it is determined that an input has been made (YES in S202), the CPU 61 selects the sensor unit for which a light-shielded portion has been produced in the output signal (S203). Using the selected sensor unit, the CPU 61 calculates the respective directions (angles) in which the light-shielded portion is produced (S204). Here, the sample data obtained in a state where that light projector is emitting light is defined as the Norm_Data[N].

Then, the CPU 61 can calculate the direction of the touch position, or to rephrase, the angle, using the signals indicated in FIGS. 4A to 4C.

Specifically, the CPU 61 first determines whether or not an input has been made using a pointing device, and whether or not a light-shielded portion is present, using the Base-_Data[N] and the Ref_Data[N] stored in the memory 64. First, to specify the light-shielded portion, an amount of change in the data at each pixel is calculated and compared with a pre-set threshold Vtha.

$$\text{Norm\_Data0}[N] = \text{Norm\_Data}[N] - \text{Ref\_Data}[N] \tag{11}$$

Here, Norm_Data0[N] represents an absolute amount of change in the light amount at each pixel; by comparing with the threshold, error caused by noise or the like is prevented and a predetermined amount of definite change is detected. Then, in the case where data exceeding the threshold has occurred for greater than or equal to a predetermined number of consecutive pixels, for example, it is determined that a touch operation has been made. This process is simply a comparison that finds a difference, and thus the computation can be made in a short time, and whether or not an input has been made can therefore be determined quickly.

Next, to make a more accurate detection, a ratio of change in the pixel data is calculated and an input point is determined using Formula (12).

$$\text{Norm\_Data}R[N] = \text{Norm\_Data0}[N]/(\text{Base\_Data}[N] - \text{Ref\_Data}[N]) \tag{12}$$

A different threshold Vthr is applied to this pixel data (light amount distribution). Then, on the basis of the pixel numbers at a rise point and a fall point in a light amount variation area corresponding to the light-shielded portion in the light amount distribution, which correspond to points where that threshold Vthr is crossed, the angle is calculated by taking the center between the two pixel numbers as a pixel corresponding to the input made using the pointing device.

FIG. 4D illustrates an example of calculating the ratio of change in the pixel data. It is assumed here that when detecting on the basis of the threshold Vthr, the rise area of the light-shielded portion reaches a level Ls at an Ns-th pixel and exceeds the threshold Vthr. Furthermore, it is assumed that the level drops to a level Lt at an Nt-th pixel and drops below the threshold Vthr.

At this time, a pixel number Np of the line CCD that is to be output may be calculated as a median value of the pixel numbers of the rise area and the fall area as indicated in Formula (13), but doing so means that the pixel interval of the line CCD will be the resolution of the output pixel number.

$$Np = ((Ns-1) + Nt)/2 \tag{13}$$

Accordingly, to make the detection at a higher resolution, an estimated pixel number where the threshold Vthr will be crossed is calculated using the data levels of the respective pixels and the data levels of the adjacent pixels previous thereto.

When the level of a pixel Ns is represented by Ls, the level of an Ns−1th pixel is represented by Ls−1, the level of a pixel Nt is represented by Lt, and the level of an Nt−1th pixel is represented by Lt−1, the respective estimated pixel numbers Nsv and Ntv can be calculated as:

$$Nsv = Ns-1 + (Vthr-Ls-1)/(Ls-Ls-1) \tag{14}$$

$$Ntv = Nt-1 + (Vthr-Lt-1)/(Lt-Lt-1) \tag{15}$$

Through these formulae, estimated pixel numbers based on the output levels, or in other words, pixel numbers that are finer than the pixel numbers of the line CCD, can be obtained. An estimated center pixel Npv of the estimated pixel numbers Nsv and Ntv is then determined through Formula (16).

$$Npv = (Nsv + Ntv)/2 \tag{16}$$

Thus a higher-resolution detection can be realized by calculating the virtual estimated pixel numbers where the threshold Vthr at a predetermined level is crossed from pixel numbers of the pixels whose data levels exceed the threshold Vthr and the pixel numbers adjacent thereto, and from the data levels thereof, in this manner.

Figure 9A:
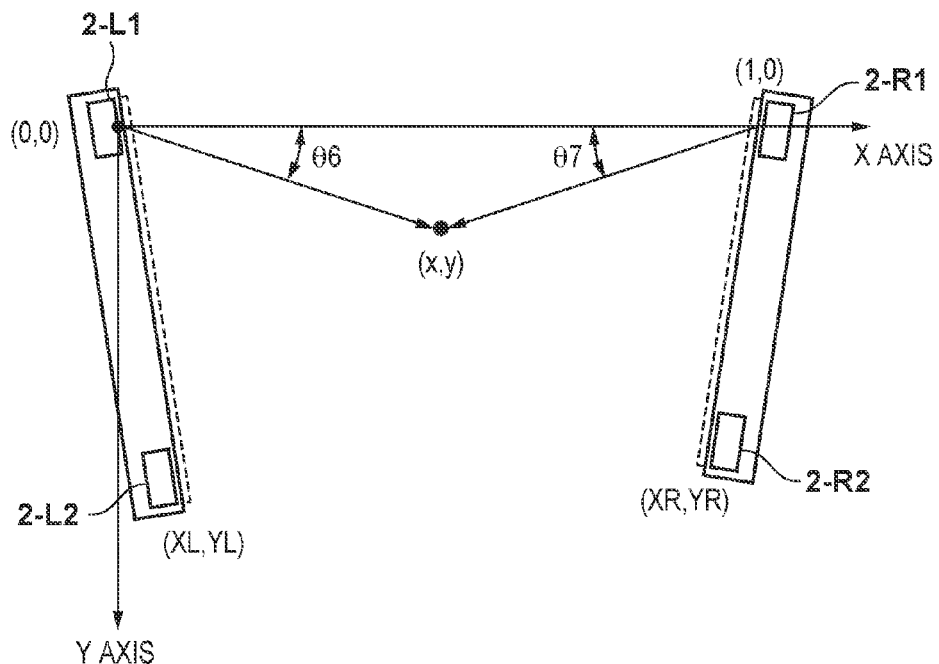
FIGS. 9A and 9B are diagrams illustrating coordinate calculation according to the first embodiment.

Next, an example of expressing a position on the screen when a light-shielded portion (a shadow) is produced by a touch will be described with reference to FIGS. 9A and 9B. In FIG. 9A, an angle of the light-shielded portion detected by the sensor unit 2-L1 is represented by θ6 and an angle of the light-shielded portion detected by the sensor unit 2-R1 is represented by θ7. Likewise, in FIG. 9B, an angle of the light-shielded portion detected by the sensor unit 2-L2 is represented by θ8 and an angle of the light-shielded portion detected by the sensor unit 2-R2 is represented by θ9. Here, θ8 and θ9 are angles obtained when a direction parallel to the X axis and the respective sensor units (a direction indicated by the dotted line) is taken as a reference.

Here, the direction parallel to the sensor unit 2-L2 and the X axis is calculated as a direction (angle) obtained by rotating the direction when the sensor unit 2-R1 is detected by the sensor unit 2-L2 by θ3, when the relative coordinates of each sensor unit are calculated, as indicated in FIG. 5. The same applies to the sensor unit 2-R2, where the direction parallel to the X axis is calculated as a direction (angle) obtained by rotating the direction when the sensor unit 2-L1 is detected by the sensor unit 2-R2 by θ1.

The CPU 61 calculates the coordinates of the specified position in the relative coordinate system on the basis of these calculated angles (S205). The process of calculating the coordinates of the specified position is carried out as described hereinafter.

Based on FIG. 9A, the following relational expression holds true for the angle detected by the sensor unit 2-L1 and coordinates (x,y) of the light-shielded portion.

$$y = x^* \tan \theta 6 \qquad (17)$$

Likewise, the following relational expression holds true for the angle detected by the sensor unit 2-R1 and coordinates of the light-shielded portion.

$$y = (1-x)^* \tan \theta 7 \qquad (18)$$

Figure 9B:
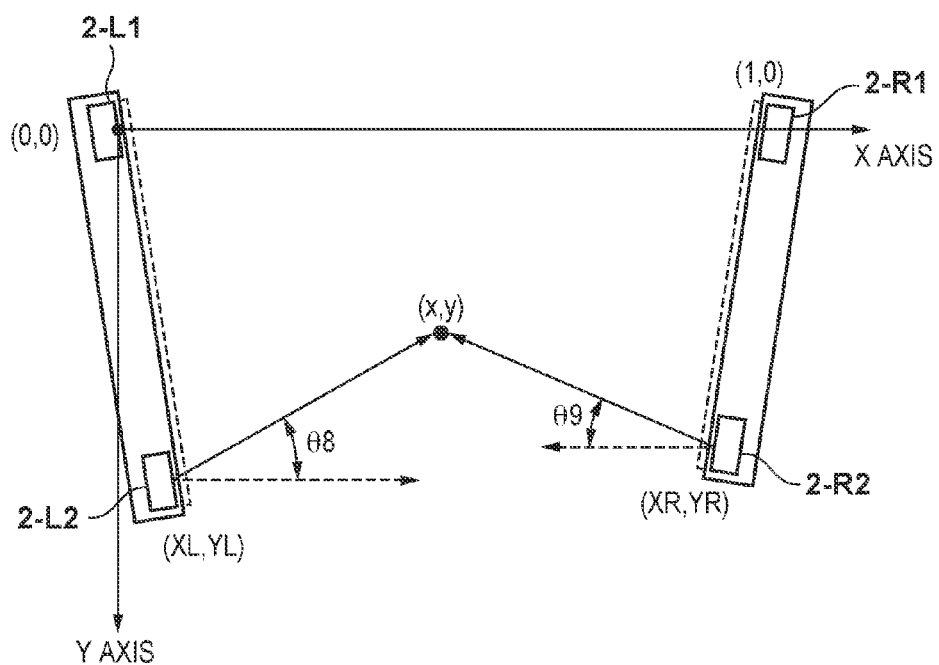

Likewise, based on FIG. 9B, the following relational expression holds true for the angle detected by the sensor unit 2-L2 and coordinates of the light-shielded portion.

$$YL - y = (x - XL)^* \tan \theta 8 \qquad (19)$$

Likewise, the following relational expression holds true for the angle detected by the sensor unit 2-R2 and coordinates of the light-shielded portion.

$$YR - y = (XR - x)^* \tan \theta 9 \qquad (20)$$

Figure 10A:
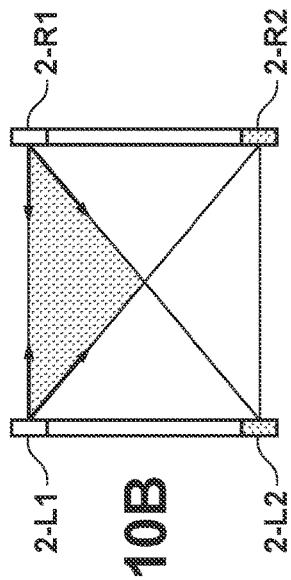
FIGS. 10A to 10E are diagrams illustrating coordinate calculation according to the first embodiment.
Figure 10B:
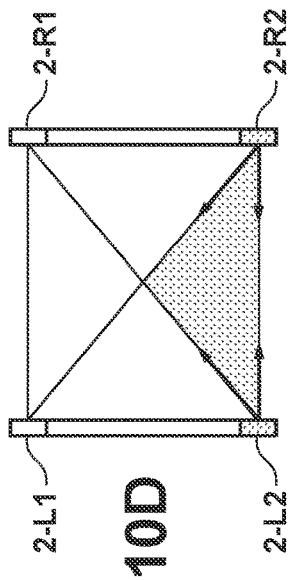
Figure 10C:
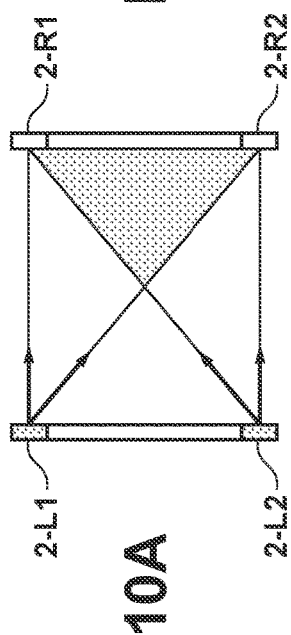
Figure 10D:
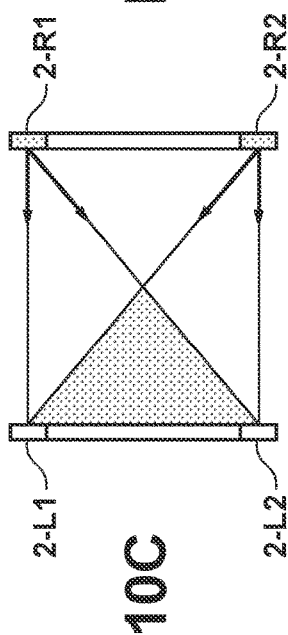

Here, FIGS. 10A to 10E are diagrams illustrating positional relationships with screen coordinates. Visual field ranges of the sensor unit 2-L1 and the sensor unit 2-L1 of the sensor bar 1L are ranges between the two arrows indicated for each of those sensor units. Accordingly, based on the visual field ranges of the sensor unit 2-L1 and the sensor unit 2-L2, a specified position P can only be calculated in the case where the specified position P is within the range indicated by the hatching in FIG. 10A. In the case where the specified position is not within that range, the combination of the sensors units used in the calculation is changed as indicated in FIGS. 10B, 10C, and 10D, making it possible to detect the specified position throughout the entire coordinate-input effective area 5. Accordingly, the sensor units needed to calculate the coordinates are selected on the basis of whether or not there is a light-shielded direction detected by the respective sensor units 2 and those light-shielding directions, and the coordinates of the specified position are calculated.

Figure 10E:
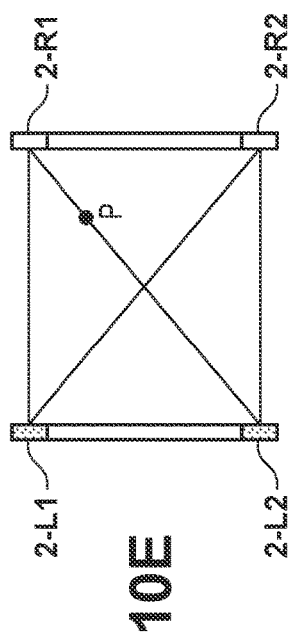

Note that if the specified position P is present near a border region for selecting the sensor units as indicated in FIG. 10E, that specified position can be calculated by combining the sensor units in the states indicated in FIG. 10A or FIG. 10B. As a specific configuration, for example, the visual field range of the sensor unit 2-L2 and the visual field range of the sensor unit 2-R1 are set so as to overlap in the direction of an opposing corner line in the coordinate-input effective area 5. In the case where this overlapping area is touched, the coordinates can be calculated according to a plurality of sensor unit combinations. In this case, an average value of the coordinate values calculated through the two combinations may be output as final coordinates.

First, a light-shielded portion in the area indicated in FIG. 10A is detected by the sensor unit 2-L1 and the sensor unit 2-L2. Based on Formula (17) that holds true for the sensor unit 2-L1 and Formula (19) that holds true for the sensor unit 2-L2, the following formula holds true:

$$x = (YL + XL^* \tan \theta 8)/(\tan \theta 6 + \tan \theta 8) \qquad (21)$$

x is calculated from Formula (21), and furthermore, y is calculated from the calculated x and Formula (17).

Next, a light-shielded portion in the area indicated in FIG. 10B is detected by the sensor unit 2-L1 and the sensor unit 2-R1. Based on Formula (17) that holds true for the sensor unit 2-L1 and Formula (18) that holds true for the sensor unit 2-R1, the following formula holds true:

$$x = \tan \theta 7/(\tan \theta 6 + \tan \theta 7) \qquad (22)$$

x is calculated from Formula (22), and furthermore, y is calculated from the calculated x and Formula (17).

In the same manner, based on Formula (18) that holds true for the sensor unit 2-R1 and Formula (20) that holds true for the sensor unit 2-R2, the following formula holds true for the area indicated in FIG. 10C:

$$x = (\tan \theta 7 + XR^* \tan \theta 9 - YR)/(\tan \theta 7 + \tan \theta 9) \qquad (23)$$

x is calculated from Formula (23), and furthermore, y is calculated from the calculated x and Formula (18).

In the same manner, based on Formula (19) that holds true for the sensor unit 2-L2 and Formula (20) that holds true for the sensor unit 2-R2, the following formula holds true for the area indicated in FIG. 10D:

$$x = (XL^* \tan \theta 8 + XR^* \tan \theta 9 + YL - YR)/(\tan \theta 8 + \tan \theta 9) \qquad (24)$$

x is calculated from Formula (24), and furthermore, y is calculated from the calculated x and Formula (19).

As described earlier, the direction parallel to the X axis for the sensor unit 2-L2 is calculated as a direction (angle) obtained by rotating the direction when the sensor unit 2-R1 is detected by the sensor unit 2-L2 by θ3, as indicated in FIG. 5. The same applies to the sensor unit 2-R2, where the direction parallel to the X axis is calculated as a direction (angle) obtained by rotating the direction when the sensor unit 2-L1 is detected by the sensor unit 2-R2 by θ1.

Here, error arises due to a variety of factors in an actual coordinate input apparatus. To give several main causes of such error, for example, there is quantization error occurring when light detected by the line CCD is quantized in units of pixels. Furthermore, when converting from a pixel number detected by the line CCD to an angle, table lookup or polynomial approximation is used for the conversion, and error also arises at that time. In addition, the aforementioned reference angle information is measured when, for example, the apparatus is assembled at a factory or the like, and measurement error occurs at that time. Further still, if, for example, attachment positions in sensor unit, optical systems therein, and so on shift over time, further error will occur. The calculated angle values will contain error due to these various factors.

If θ1 or θ3 contain error due to error in the angular characteristics of the sensor units, the direction that is expected to be parallel to the X axis (the direction indicated by the dotted line in FIG. 5) will become shifted. As indicated in FIGS. 9A and 9B, θ8 and θ9 are calculated using the direction parallel to the X axis as a reference, and thus angular error in θ1 and θ3 will also be added directly to θ8 and θ9 as error.

Furthermore, if θ8 and θ9 become acute angles having low values, the ratio of angular error in θ1 and θ3, which corresponds to the error components contained in θ8 and θ9, will become relatively higher. Here, in Formula (24), (tan θ8+tan θ9) serves as the denominator in the division, and thus lower values for θ8 and θ9 will result in the error appearing in the calculation result having value higher than a predetermined value. There is thus a trend for error to become greater particularly in areas near the bottom side of the coordinate-input effective area 5 (a predetermined area in the coordinate-input effective area). In the present embodiment, the coordinates are calculated using a different method in the area indicated in FIG. 10D in order to improve on this problem.

First, coordinate values are calculated using the angle values detected in the second coordinate system. Based on FIG. 6, the following holds true:

$$y = -x^* \tan \theta 10 \quad (25)$$

$$y = -(1-x)^* \tan \theta 11 \quad (26)$$

Based on Formulae (25) and (26), the following holds true:

$$x = \tan \theta 11/(\tan \theta 10 + \tan \theta 11) \quad (27)$$

x is calculated from Formula (27), and y is then calculated from the calculated x and Formula (25).

Next, the calculated coordinate values in the second coordinate system are converted into coordinate values in the first coordinate system. When the coordinate values in the second coordinate system are represented by (x,y) and the coordinate values in the first coordinate system are represented by (x',y'), the coordinate conversion can be carried out as indicated in the following formulae, using the conversion parameters calculated in S109 (the distance Lb and the angle of rotation θb). Note that this coordinate value conversion includes at least one of coordinate value rotation, enlargement of the coordinate values in a predetermined direction, and parallel movement (offset) of the coordinate values. As such, in the case where the coordinate values are converted by rotating the coordinate values, the conversion parameter is an angle of rotation in that rotation process. In the case where the coordinate values are converted by enlarging the coordinate values in a predetermined direction, the conversion parameter is an enlargement rate used in that enlargement process. Furthermore, in the case where the coordinate values are converted through parallel movement (offset) of the coordinate values, the conversion parameter is an offset amount used in that offset process.

$$x' = (x^* \cos \theta b - y^* \sin \theta b)^* Lb + XL \quad (28)$$

$$y' = (x^* \sin \theta b - y^* \cos \theta b)^* Lb + YL \quad (29)$$

In the area indicated in FIG. 10D, (x',y') calculated using Formulae (28) and (29) are employed as the coordinate calculation results.

θ10 and θ11 in Formula (27) are angles measured using, as a reference, directions in which light from the opposing sensor units is detected in the aforementioned process for detecting the installation position of the apparatus. As indicated by Formula (24), no angular error is added to θ1 and θ3, and thus the angle error can be suppressed to a low amount.

In Formulae (28) and (29), error in θb, Lb, and the like appears as error in the coordinate calculation result. However, compared to the coordinate calculation result obtained using Formula (24), the magnitude of the error that occurs is significantly lower, and thus the accuracy of the coordinates calculated for the touch position is improved. In addition, although the present embodiment describes a system constituted by four sensor units as an example, as long as there are three or more sensor units, there will be a plurality of combinations that can be made by selecting two of those sensor units. Accordingly, a plurality of coordinate systems can be set by using the plurality of combinations, and thus the present embodiment can be applied as long as the configuration includes at least three sensor units.

Through the aforementioned processing, the CPU 61 calculates the relative coordinate values (x,y) of the specified position in the relative coordinate system for the specified position, and converts the calculated relative coordinate values of the specified position into coordinate values in a display coordinate system (S206). Projection conversion or the like can be given as a method for converting the calculated relative coordinate values of the specified position into the coordinate values in the display coordinate system. Because this is a typical coordinate conversion method, detailed descriptions thereof will not be given here. However, a process for obtaining parameters necessary for this coordinate conversion will be described later.

The CPU 61 then outputs (sends) the coordinate values resulting from the conversion to an external device such as a personal computer or the like (S207).

Note that at this time, a touch-down signal/touch-up signal, indicating whether or not the input screen is being touched, may also be output. In this type of coordinate input apparatus, the optical path is blocked 100% when the touch surface is touched, but small amounts of light progressively pass as the pointing device is lifted from the touch state. Accordingly, calculating the degree to which the light is blocked makes it possible to determine, by setting a threshold, whether the state is a touch state, or a state in which the surface is not being touched but the optical path is blocked (that is, a state in which angles can be calculated and the position thereof can also be calculated even in such a state).

Next, a process for obtaining parameters necessary when converting the relative coordinate values in the relative coordinate system for the specified position into coordinate values in the display coordinate system will be described.

As illustrated in FIG. 1, the display coordinate system is a linear, two-dimensional coordinate system that takes d1 as an origin and has a dX axis and a dY axis. Information indicating a positional relationship between the relative coordinate system and the display coordinate system (correlation information) is necessary in order to set the parameters for the coordinate conversion. A process called calibration is carried out in order to obtain the necessary information.

Normally, to realize such calibration, a dedicated application is installed in a personal computer (PC) that is carrying out the display control. When the application is launched, an indicator such as a plus-shaped cross or the like is displayed in the display screen, and the user is then prompted to touch the position of that indicator. Coordinate system conversion is then carried out so that coordinate values in the relative coordinate system obtained by repeating that operation a predetermined number of times in different positions match coordinate values in the display coordinate system at positions where the indicator is displayed.

In the coordinate input apparatus according to the first embodiment, the calibration is realized by touching the four corners of the display screen, rather than displaying an indicator using application software and having the user touch the position thereof. Employing such configuration provides a useful effect in that the apparatus can be used immediately by connecting to a nearby PC, without installing any special software.

This calibration mode is transited to by, for example, manipulating a switching unit such as a switch or the like provided in the coordinate input apparatus. A flowchart for this calibration mode is indicated in FIG. 8B, and details of the processing will be described next.

The calibration mode is executed immediately after the sensor bars 1 have been installed, or in the case where the position of the display has shifted for some reason after the installation has already been completed. Upon transiting to the calibration mode, first, the CPU 61 carries out the initial setting process (S101). This is done assuming a case where the positions of the sensor bars have shifted during use, so as to optimize the optical output and correct for positional shifting in the sensors.

Then, S201 and S202 are carried out to allow the user to touch the four corners of the display area 6, and the CPU 61 determines whether one of those positions has been touched. In S203 and S204, the CPU 61 calculates the necessary angle information. The CPU 61 then makes a notification that the data has been successfully obtained (S301). This notification is carried out by, for example, outputting a beep sound indicating that the obtainment is complete.

Next, the CPU 61 determines whether or not the information has been obtained for all four corners of the display area 6 (S302). The process returns to S201 in the case where the obtainment is not complete (NO in S302). However, in the case where the obtainment is complete (YES in S302), the CPU 61 calculates the parameters for converting from the relative coordinate system to the display coordinate system (S303). Coordinate values at four corresponding locations are obtained from both the relative coordinate system and the display coordinate system, and thus the coordinate conversion can be carried out through a method such as projection conversion, and the necessary parameters (values of elements in a transformation matrix or the like) can be calculated.

The calibration mode is completed through the aforementioned processing, and the operations then return to normal operations (that is, the process advances to S201 in FIG. 8A). The parameters calculated in the calibration mode are then used in the coordinate conversion carried out in S206.

Positions in the display screen relative to the installation position of the apparatus are associated through the aforementioned calibration processing, and thus at this time, it is possible to examine whether or not the display screen is in the effective range of the apparatus. For example, in the case where it is determined that the display screen is outside of the effective range as a result of examining the effective range, a process may be carried out that prompts the user to readjust the display screen by emitting a beep sound, audio, or the like, for example.

Alternatively, there is a method in which driver software is run in advance on a connected PC for carrying out screen adjustment. According to this method, when it is determined through the calibration process that the display screen is outside the effective range, information indicating an amount by which the display screen is shifted from the effective range is sent to the driver software. The driver software can receive this information and automatically adjust the display screen.

As described thus far, according to the first embodiment, the accuracy of coordinates calculated for a touch position can be improved.

Second Embodiment

The first embodiment describes a configuration in which touch coordinates are calculated by varying the combinations of sensor units used in the calculation for the areas indicated in FIGS. 10A to 10D. At this time, error tends to exceed a predetermined value particularly in areas near the bottom side of the coordinate-input effective area 5, and thus the accuracy of the coordinates calculated for the touch position is improved by calculating the coordinates in the area indicated in FIG. 10D using a different method.

As opposed to this, a second embodiment describes another example of a coordinate calculation process carried out for the area indicated in FIG. 10D, executed in S205 of FIG. 8A. The configuration of the apparatus and so on is the same as in the first embodiment, and thus descriptions thereof will be omitted.

First, coordinates are calculated in the first coordinate system for the area indicated in FIG. 10D. As described in the first embodiment, x is calculated from Formula (24), and furthermore, y is calculated from the calculated x and Formula (19). The calculated coordinate values are represented by (x1,y1).

Next, coordinates are calculated in the second coordinate system using Formulae (25) to (29). The calculated coordinate values are represented here by (x2,y2). Next, a ratio based on the value of y2 is determined, and an average of (x1,y1) and (x2,y2) is calculated.

Here, two reference values are used in order to determine the ratio for the average calculation. These reference values are calculated in advance in S108 of FIG. 3. When the two reference values are represented by Y0 and Y1, the calculation is as follows, for example.

$$Y0 = \text{MIN}(YL, YR) * 0.6 \quad (30)$$

$$Y1 = \text{MIN}(YL, YR) * 0.8 \quad (31)$$

Figure 11:
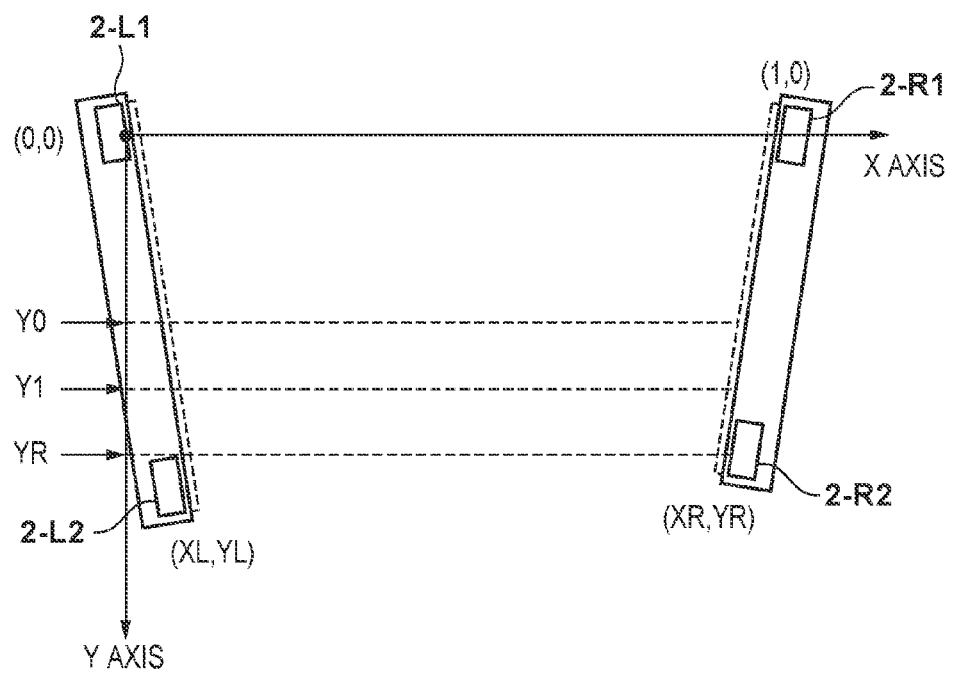
FIG. 11 is a diagram illustrating coordinate calculation according to the first embodiment.

Here, MIN( ) represents a function that returns the minimum value among the arguments. The positions of Y0 and Y1 are as indicated in FIG. 11, for example. In FIG. 11, YR<YL, and thus Y0 and Y1 are values equivalent to 0.6× and 0.8× the value of YR, respectively. Here, the values of 0.6, 0.8, and so on are set in advance as fixed values, in consideration of the range in which the average calculation is carried out. When the calculated average coordinate values are represented by (x3,y3), (x3,y3) are calculated as follows, depending on the magnitude relationship between y2, and Y0 and Y1.

When y2≤Y0:

$$x3 = x1 \quad (32)$$

$$y3 = y1 \quad (33)$$

When Y0<y2<Y1:

$$x3=((y1-Y0)*x2+(Y1-y1)*x1)/(Y1-Y0)) \quad (34)$$

$$y3=((y1-Y0)*y2+(Y1-y1)*y1)/(Y1-Y0)) \quad (35)$$

When Y1≤y2:

$$x3=x2 \quad (36)$$

$$y3=y2 \quad (37)$$

In the area indicated in FIG. 10D, (x3,y3) calculated using Formulae (32) to (37) are employed as the coordinate calculation results. In this calculation method, first, the area where Y1≤y2 is an area near the bottom side of the coordinate-input effective area 5, where detection error becomes particularly high in the coordinate values, and thus (x2,y2) are employed. On the other hand, in the area where y2≤Y0, (x1,y1) are employed. In the area therebetween, where Y0<y2<Y1, a weighted average is taken for (x1,y1) and (x2,y2) in accordance with the position of y2. Here, a weighted average of both may be taken in the area where Y0<y2<Y1, in order to connect the borders between areas in a smooth manner. As another example, it is also possible to not provide an area where a weighted average is taken, such as in the case where, for example, a difference between (x1,y1) and (x2,y2) is sufficiently low near a border between areas. In this case, the process becomes one in which a single border is set and one of (x1,y1) and (x2,y2) is selected; as such, Formulae (34) and (35) are not used, which makes it possible to simplify the calculations.

Although different calculations are carried out in accordance with the magnitude relationship between y2, and Y0 and Y1, in the present embodiment, the processing is not limited to y2; for example, y0 may be used, a value obtained by averaging y0 and y2 may be used, and so on. Alternatively, different processes may be carried out in the x direction by further using the value of x. The way in which the areas are divided may be determined in consideration of the tendency of errors to arise.

As described thus far, according to the second embodiment, the coordinates are calculated in accordance with a distance of the touch position from the bottom end of the coordinate-input effective area 5, by examining the calculated y coordinate. As a result, the accuracy of the coordinates in areas near the lower side, where the coordinate calculation error in particular is greater than in other areas, can be improved.

Third Embodiment

Although the sensor units include infrared LEDs as light projectors and line CCD sensors as light receptors in the aforementioned embodiments, the invention is not limited thereto. As another example, the aforementioned embodiments can also be applied in a system that uses cameras, which are image capturing devices.

In this case, to use FIG. 1 as an example, the sensor units 2-L1, 2-L2, 2-R1, and 2-R2 include cameras. Each camera captures an image in the direction of the coordinate-input effective area 5, and angles at which the other cameras are positioned are detected through an image recognition process such as matching or the like. Using the mutually-detected angles, the position in which the coordinate input apparatus is installed can be detected in the same manner as in the first embodiment.

Note that a method that detects input from a finger or the like using image recognition processing, a method that uses a stylus, and so on can be given as methods for detecting touches using cameras. In a method that uses a stylus, for example, an LED is provided in the tip of the stylus, the LED is caused to emit light during a touch, and the angle of the input is detected by the camera detecting that emitted light. The coordinate values of that touch position can then be calculated on the basis of the detected angles.

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-021490, filed Feb. 5, 2015, which is hereby incorporated by reference herein in its entirety.

What is claimed is:

1. A coordinate input apparatus that detects a specified position in a coordinate-input effective area using a light projector that projects light onto a coordinate input surface and a plurality of light receptors that receive the light projected by the light projector, the apparatus comprising:
the plurality of light receptors;
a memory that stores instructions; and
a processor that executes the instructions stored in the memory to:
set a first coordinate system based on a positional relationship between two light receptors constituting a first combination of light receptors;
set a second coordinate system based on a positional relationship between two light receptors constituting a second combination of light receptors different from the first combination of light receptors, the plurality of light receptors including the first combination of light receptors and the second combination of light receptors having a same arrangement for the first coordinate system and second coordinate system; and convert a coordinate value, in the second coordinate system, of the specified position detected using the second combination of light receptors into a coordinate value in the first coordinate system based on the positional relationship between the first combination of light receptors.

2. The coordinate input apparatus according to claim 1, wherein one of two axes that define the first coordinate system is set to a direction in which the two light receptors in the first combination are connected by a straight line, and wherein one of two axes that define the second coordinate system is set to a direction in which the two light receptors in the second combination are connected by a straight line.

3. The coordinate input apparatus according to claim 1, wherein the processor executes further instructions to:

select two light receptors of the plurality of light receptors on the basis of light reception information detected by the light receptors; and determine a coordinate on the basis of the combination of the selected two light receptors.

4. The coordinate input apparatus according to claim 3, wherein the two light receptors of the plurality of light receptors are selected on the basis of whether or not at least one position indicated by coordinate values is within a predetermined area in the coordinate-input effective area.

5. The coordinate input apparatus according to claim 1, wherein the processor executes further instructions to determine a coordinate on the basis of an average of a plurality of coordinate values based on at least two combinations of two light receptors from the plurality of the light receptors.

6. The coordinate input apparatus according to claim 1, wherein the coordinate value of the specified position is converted using parameters, and wherein the parameters include at least one of a rotation angle in a rotation process that converts the coordinate value by rotating the coordinate value, an enlargement rate in an enlargement process that converts the coordinate value by enlarging the coordinate value in a predetermined direction, and an offset amount in an offset process that converts the coordinate value by offsetting the coordinate value.

7. The coordinate input apparatus according to claim 1, wherein the processor executes further instructions to:

detect a positional relationship between the plurality of light receptors; and recursively reflect light, wherein the positional relationship between the plurality of light receptors is detected on the basis of light reception information of each light receptor of the plurality of light receptors obtained from the reflected light.

8. The coordinate input apparatus according to claim 1, wherein the processor executes further instructions to:

detect a positional relationship between the plurality of light receptors; and store reference angle information indicating an angle formed between an optical axis of a first light receptor among the plurality of light receptors, and a straight line connecting a center of an optical axis of the first light receptor and a center of an optical axis of a second light receptor, wherein the positional relationship between the plurality of light receptors is detected on the basis of light reception information of the first light receptor, the second light receptor, a third light receptor, and the stored reference angle information.

9. The coordinate input apparatus according to claim 1, further comprising a plurality of sensor bars, each sensor bar of the plurality of sensor bars including at least two of the plurality of light receptors, wherein each of a first light receptor of the two light receptors constituting the first combination or second combination of the plurality of light receptors is provided on a different sensor bar of the plurality of sensor bars than each of a corresponding second light receptor of the two light receptors constituting the first combination or second combination of the plurality of light receptors.

10. The coordinate input apparatus according to claim 1, further comprising:

a plurality of sensor bars, each sensor bar of the plurality of sensor bars including at least two of the plurality of light receptors, wherein a first light receptor of the two light receptors of the first combination of light receptors is provided on a different sensor bar of the plurality of sensor bars than a second light receptor of the two light receptors, and wherein a first light receptor of the two light receptors of the second combination of light receptors is provided on a different sensor bar of the plurality of sensor bars than a second light receptor of the two light receptors.

11. A control method of controlling a coordinate input apparatus that detects a specified position in a coordinate-input effective area using a light projector that projects light onto a coordinate input surface and a plurality of light receptors that receive the light projected by the light projector, the method comprising:

setting a first coordinate system based on a positional relationship between two light receptors constituting a first combination of light receptors;

setting a second coordinate system based on a positional relationship between two light receptors constituting a second combination of light receptors different from the first combination of light receptors, the plurality of light receptors including the first combination of light receptors and the second combination of light receptors having a same arrangement for the first coordinate system and second coordinate system; and converting a coordinate value, in the second coordinate system, of the specified position detected using the second combination of light receptors into a coordinate value in the first coordinate system based on the positional relationship between the first combination of light receptors.

12. A non-transitory computer-readable storage medium storing a computer program for causing a computer to execute a control method of controlling a coordinate input apparatus that detects a specified position in a coordinate-input effective area using a light projector that projects light onto a coordinate input surface and a plurality of light receptors that receive the light projected by the light projector, the method comprising:

setting a first coordinate system based on a positional relationship between two light receptors constituting a first combination of light receptors;

setting a second coordinate system based on a positional relationship between two light receptors constituting a second combination of light receptors different from the first combination of light receptors, the plurality of light receptors including the first combination of light receptors and the second combination of light receptors having a same arrangement for the first coordinate system and second coordinate system; and
converting a coordinate value, in the second coordinate system, of the specified position detected using the second combination of light receptors into a coordinate value in the first coordinate system based on the positional relationship between the first combination of light receptors.

* * * * *